(12) United States Patent
Teo et al.

(10) Patent No.: US 7,731,431 B2
(45) Date of Patent: Jun. 8, 2010

(54) ELECTROMAGNETIC RADIATION SHIELD FOR AN OPTICAL SUBASSEMBLY

(75) Inventors: Tat Ming Teo, Compassvale Link (SG); Gary Dean Sasser, San Jose, CA (US); Jinxiang Liu, Singapore (SG); Gary Landry, Allen, TX (US); Harold Y. Walker, Jr., Plano, TX (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 12/130,843

(22) Filed: May 30, 2008

(65) Prior Publication Data

US 2008/0298041 A1    Dec. 4, 2008

Related U.S. Application Data

(63) Continuation-in-part of application No. 12/125,748, filed on May 22, 2008, now Pat. No. 7,621,678.

(60) Provisional application No. 60/941,214, filed on May 31, 2007, provisional application No. 60/969,372, filed on Aug. 31, 2007.

(51) Int. Cl.
    *G02B 6/36*    (2006.01)
(52) U.S. Cl. .......................... 385/88; 361/818; 385/92
(58) Field of Classification Search ............. 385/88–94, 385/147; 361/800, 816, 818; 250/515.1
    See application file for complete search history.

(56) References Cited

U.S. PATENT DOCUMENTS

| | | | |
|---|---|---|---|
| 3,787,014 A | 1/1974 | Story et al. | |
| 4,891,020 A | 1/1990 | Dunn | |
| 5,852,257 A | 12/1998 | Dittman et al. | |
| 6,163,454 A | 12/2000 | Strickler | |
| 6,407,932 B1 | 6/2002 | Gaio et al. | |
| 6,474,876 B1 | 11/2002 | Sikorski | |
| 6,652,158 B2* | 11/2003 | Bartur et al. | 385/92 |
| 6,744,639 B1* | 6/2004 | Branch et al. | 361/818 |
| 6,764,338 B2 | 6/2004 | Fang | |
| 7,111,994 B2 | 9/2006 | Schwiebert et al. | |
| 7,229,295 B2 | 6/2007 | Ice et al. | |
| 7,476,039 B2* | 1/2009 | Moore | 385/92 |
| 2001/0024551 A1* | 9/2001 | Yonemura et al. | 385/88 |
| 2002/0012503 A1 | 1/2002 | Kuhne | |
| 2003/0156802 A1 | 8/2003 | Togami et al. | |
| 2004/0037517 A1 | 2/2004 | Dair et al. | |
| 2005/0286839 A1* | 12/2005 | Yoshikawa | 385/92 |
| 2006/0045436 A1 | 3/2006 | Wang et al. | |

(Continued)

OTHER PUBLICATIONS

Tat-Ming Teo et al., Electromagnetic Radiation Shield for an Optical Subassembly, U.S. Appl. No. 12/130,833, filed May 30, 2008.

(Continued)

*Primary Examiner*—Ellen Kim
(74) *Attorney, Agent, or Firm*—Workman Nydegger

(57) ABSTRACT

In one example embodiment, an electromagnetic radiation (EMR) shield includes a central portion, an opening defined in the central portion, a wing attached to and extending outward from the central portion, and a protrusion defined in the wing. The perimeter of the EMR shield is approximately the same size and shape as that of a portion of an associated optical subassembly (OSA).

18 Claims, 5 Drawing Sheets

U.S. PATENT DOCUMENTS

2006/0098924 A1    5/2006    Anderl et al.
2006/0263013 A1    11/2006    Sone
2007/0201798 A1    8/2007    Kramer et al.
2008/0298041 A1*    12/2008    Teo et al. .................... 361/818
2008/0298750 A1*    12/2008    Landry et al. ................. 385/88

OTHER PUBLICATIONS

Landry et al., Electromagnetic Radiation Shield for an Optical Subassembly, U.S. Appl. No. 12/125,748, filed May 22, 2008.

United States Patent and Trademark Office, U.S. Appl. No. 12/125,748, Office action mailed Dec. 19, 2008.

Amendment "A" and Response to Office action mailed Dec. 19, 2008, U.S. Appl. No. 12/125,748, response filed Apr. 10, 2009.

United States Patent and Trademark Office, U.S. Appl. No. 12/130,833, Office action mailed Dec. 19, 2008.

Amendment "A" and Response to Office action mailed Dec. 19, 2008, U.S. Appl. No. 12/130,833, response filed May 19, 2009.

* cited by examiner

ELECTROMAGNETIC RADIATION SHIELD FOR AN OPTICAL SUBASSEMBLY

CROSS-REFERENCE TO RELATED APPLICATIONS

The present application is a continuation in part of U.S. patent application Ser. No. 12/125,748, filed May 22, 2008, and entitled "Electromagnetic Radiation Shield for an Optical Subassembly," which claims priority from U.S. Provisional Patent Application Ser. No. 60/941,214, filed May 31, 2007, and entitled "Electromagnetic Radiation Shield for an Optical Subassembly." The present application also claims priority from U.S. Provisional Patent Application Ser. No. 60/969,372, filed Aug. 31, 2007 and entitled "Integrated Optical Interconnect." Each of the foregoing applications is incorporated herein by reference in its entirety.

BACKGROUND

Optical subassemblies (OSAs) are increasingly used in optoelectronic communication. For example, optoelectronic transceiver devices generally include a transmitter optical subassembly (TOSA) and a receiver optical subassembly (ROSA). Some OSAs that are integrated into optoelectronic devices include an optical receptacle that is configured to receive an optical fiber connector, such as an LC or an SC connector, such that the corresponding optical fiber is capable of optically and mechanically interfacing with an optical port of the OSA.

Optoelectronic devices also generally include one or more printed circuit boards having electronic circuitry. The electronic circuitry of a printed circuit board can create electromagnetic radiation (EMR). When EMR inadvertently escapes from an optoelectronic device, the EMR can cause electromagnetic interference (EMI) in nearby electronic devices which can degrade the functionality of those electronic devices. Therefore, it is important to control the inadvertent escape of EMR from optoelectronic devices.

Another related problem is the electromagnetic susceptibility (EMS) of optoelectronic devices. The EMS of an optoelectronic device is the degree to which the optoelectronic device is subject to malfunction or failure under the influence of electromagnetic radiation. Therefore, it is also important to control the inadvertent introduction of EMR into optoelectronic devices.

Controlling the escape/introduction of EMR from/into an optoelectronic device is generally accomplished by surrounding the optoelectronic device, as much as possible, with a housing formed from an electrically conductive material, which limits the escape/introduction of EMR, thus decreasing EMI in nearby electronic devices and in the optoelectronic device. It can be difficult, however, to control the transmission of EMR through required openings in the housing of an optoelectronic device, such as the optical ports that are configured to receive optical fibers.

As mentioned above, some OSAs that are integrated into optoelectronic devices include an optical receptacle with an optical port. Such OSAs are generally formed from a non-electrically conductive material, such as plastic, and is therefore not effective at limiting the transmission of EMR. EMR may, therefore, pass into the optoelectronic device by way of the port of the OSA and/or exit the optoelectronic device by way of the port of the OSA.

Attempts have been made to control the amount of EMR that passes through an OSA. One such attempt involved shielding a plastic OSA by coating the OSA with metal. This attempt proved problematic, however, due to the increased effort required to securely adhere metal to the plastic OSA, which resulted in the metal coating flaking off, thus decreasing the effectiveness of the shielding. This attempt also failed to address the lack of shielding where the OSA interfaces with an optical fiber.

Another attempt at controlling the amount of EMR that passes through an OSA involved forming the OSA from metal instead of plastic. This attempt also proved problematic because of the increased cost in manufacturing a metal OSA over a plastic OSA, and the increased cost of assembling a metal OSA together with a plastic receptacle and/or plastic lens(es). This attempt also failed to address the lack of shielding where the OSA interfaces with an optical fiber.

In light of the above discussion, a need currently exists for an OSA that is effective at limiting the transmission of EMR out of and/or into an optoelectronic device into which the OSA is integrated.

BRIEF SUMMARY OF SOME EXAMPLE EMBODIMENTS

In general, example embodiments of the invention relate to an electromagnetic radiation (EMR) shield for an optical subassembly (OSA). In some example embodiments, the example EMR shields disclosed herein can aid in the control of the amount of EMR that passes through OSAs into which the EMR shields are integrated. These example OSAs can, in turn, be effective at limiting the transmission of EMR out of and/or into optoelectronic devices into which the OSAs are integrated. These example OSAs can be effective at limiting the transmission of EMR while avoiding the difficulties and costs associated with coating OSAs with metal or forming OSAs from metal.

In one example embodiment, an EMR shield includes a central portion, an opening defined in the central portion, a wing attached to and extending outward from the central portion, and a protrusion defined in the wing. The perimeter of the EMR shield is approximately the same size and shape as that of a portion of an associated OSA.

In another example embodiment, an OSA includes a body and an EMR shield at least partially embedded in the body. The body includes a receptacle that defines a connector port, a flange extending from the receptacle, a first barrel extending from the flange and defining a lens, a second barrel defined within the connector port that defines a fiber port configured to receive an optical fiber. The EMR shield includes a central portion, a wing attached to and extending outward from the central portion, a protrusion connected to the wing and/or the central portion that extends outside the body, and an opening defined in the central portion.

In yet another example embodiment, an optoelectronic device includes a faceplate, a printed circuit board (PCB), and an OSA attached to the faceplate and electrically connected to the PCB. The OSA includes a body and an EMR shield at least partially embedded in the body. The body includes a receptacle that defines a connector port, a flange extending from the receptacle, a first barrel extending from the flange and defining a lens, a second barrel defined within the connector port that defines a fiber port configured to receive an optical fiber. The EMR shield includes a central portion, a wing attached to and extending outward from the central portion, a protrusion connected to the wing and/or the central portion that extends outside the body and is in electrical contact with the faceplate, and an opening defined in the central portion.

BRIEF DESCRIPTION OF THE DRAWINGS

To further clarify certain aspects of the present invention, a more particular description of the invention will be rendered by reference to example embodiments thereof which are disclosed in the appended drawings. It is appreciated that these drawings depict only example embodiments of the invention and are therefore not to be considered limiting of its scope. Aspects of the invention will be described and explained with additional specificity and detail through the use of the accompanying drawings in which.

DETAILED DESCRIPTION OF SOME EXAMPLE EMBODIMENTS

Example embodiments of the present invention relate to electromagnetic radiation (EMR) shields for use in optical subassemblies (OSAs), such as transmitter optical subassemblies (TOSAs) and/or receiver optical subassemblies (ROSAs). The example EMR shields disclosed herein can aid in controlling the amount of EMR that passes through OSAs in connection with which the EMR shields are employed. These OSAs can, in turn, be effective at limiting the transmission of EMR out of and/or into optoelectronic devices into which the OSAs are integrated, while avoiding the difficulties and costs associated with approaches such as coating OSAs with metal, or forming OSAs from metal.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

1. Example Optoelectronic Device

Figure 1A:
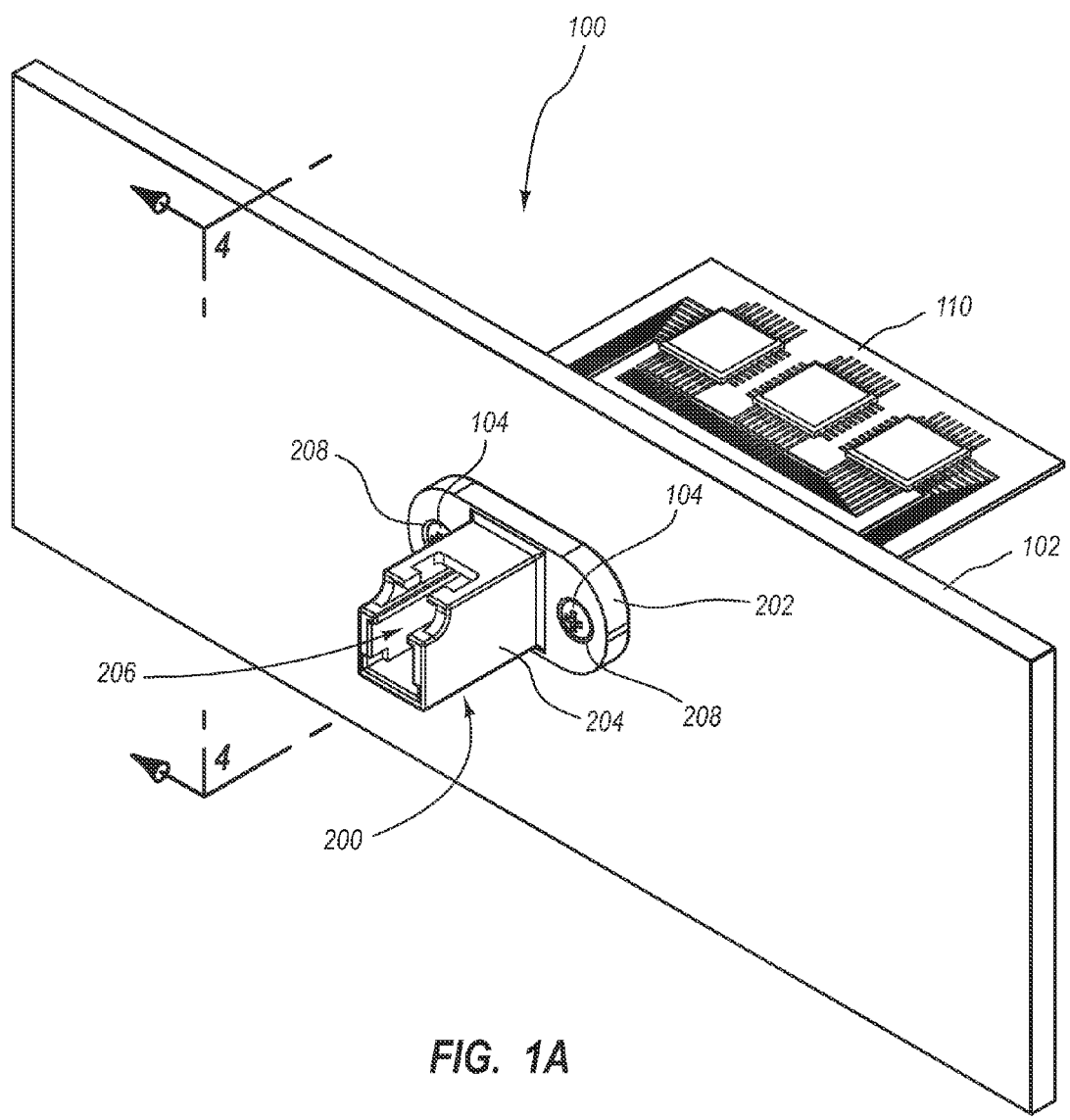
FIG. 1A is a front perspective view of portions of an example optoelectronic device with an example optical subassembly (OSA) attached thereto.
Figure 1B:
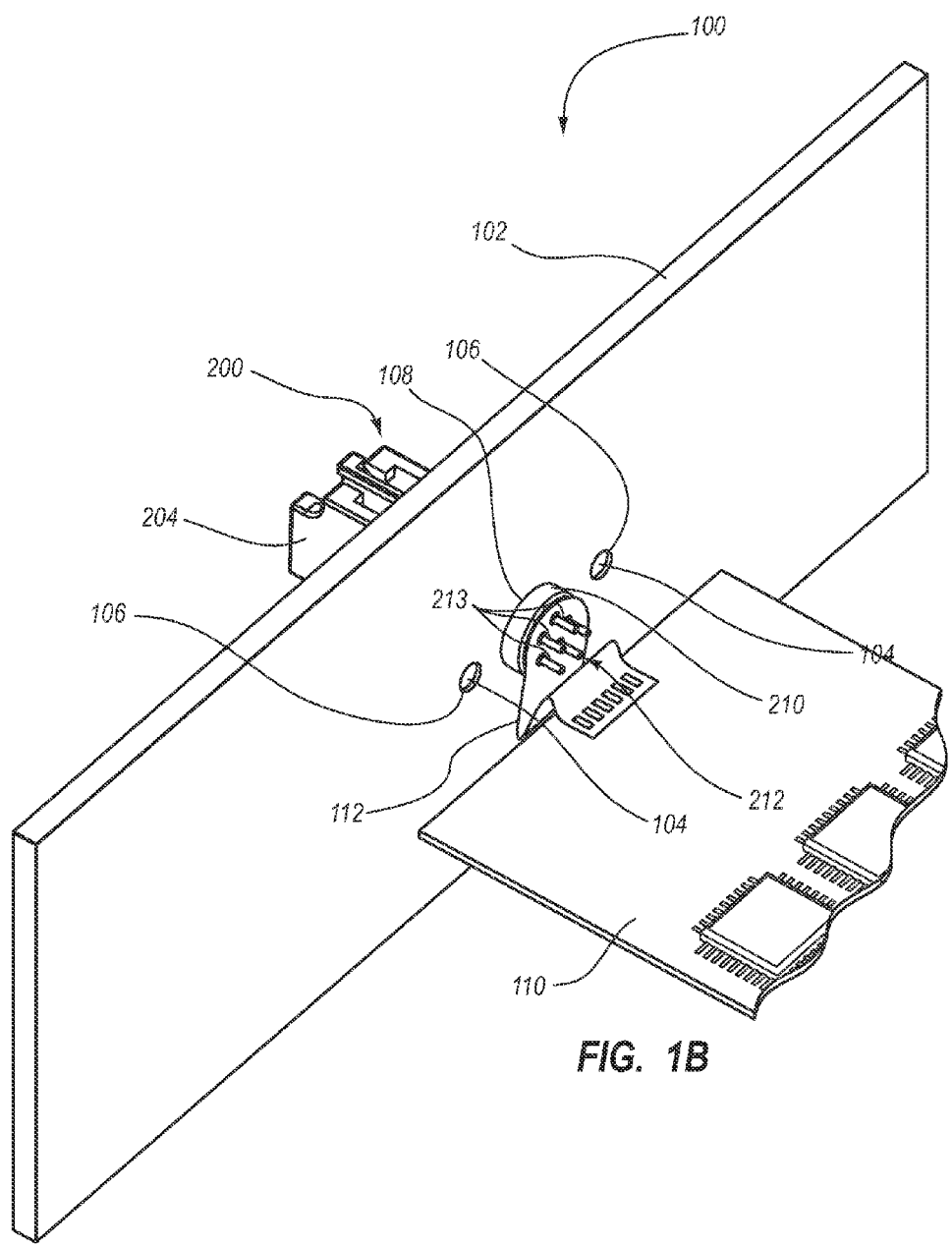
FIG. 1B is a rear perspective view of portions of the example optoelectronic device and the example OSA of FIG. 1A.

Reference is first made to FIGS. 1A and 1B, which are front and rear perspective views, respectively, of portions of an example optoelectronic device, generally designated at 100, for use in transmitting and receiving optical signals in connection with one or more other devices on a network, and communicating via electrical signals with a host device. The optoelectronic device 100 is one environment in which example embodiments of the invention can be practiced. As disclosed in FIG. 1A, the optoelectronic device 100 includes various components, including an example faceplate 102 and an example OSA 200 attached to faceplate 102 via a pair of fasteners 104. As disclosed in FIG. 1A, the body of the example OSA 200 has what is known as a "bulkhead" form factor, although various aspects of the example OSA 200 can be implemented in OSAs having various other form factors. As disclosed in FIGS. 1A and/or 1B, the example OSA 200 has a body that generally includes a flange 202, a receptacle 204 integrally connected to the flange 202, and a barrel 210 integrally connected to the flange 202. The flange 202 defines openings 208 into which fasteners 104 have been inserted in order to attach the flange 202 to the faceplate 102. The receptacle 204 defines a connector port 206 configured to removably receive an LC connector, although other embodiments of the connector port 206 may be configured to interface with other fiber optic connector types including, but not limited to, SC or FC connectors.

As disclosed in FIG. 1B, the faceplate 102 also defines openings 106 into which the fasteners 104 are received. The faceplate 102 also defines an opening 108 into which the barrel 210 of the example OSA 200 is received. The OSA 200 further includes an optical-electronic transducer assembly 212 at least partially positioned within the barrel 210. In one example embodiment, the flange 202, receptacle 204, and barrel 210 of the OSA 200 are integrally formed with each other from an optically transmissive plastic material that is molded into the shape disclosed in FIGS. 1A and 1B. This integrated design may result in reduced part cost as well as reduce assembly cost as compared with an OSA in which one or more of the flange 202, the receptacle 204, and the barrel 210 are molded separately and then later assembled together.

As disclosed in FIG. 1B, the optoelectronic device 100 further includes a printed circuit board (PCB) 110 that includes various electronic components. The PCB 110 generally enables the optoelectronic device 100 to electrically interface with a host device (not shown) into which the optoelectronic device is received. The term "PCB" as used herein includes electronic circuits on substantially rigid or substantially flexible substrates.

As such, the PCB 110 facilitates electrical communication between the OSA 200 and the host device. In addition, the above-mentioned components of the optoelectronic device 100 may be housed within a housing formed from an electrically conductive material (not shown), which limits the escape/introduction of EMR, thus decreasing EMI in nearby electronic devices and in the optoelectronic device 100. The optoelectronic device 100 may further include one or more additional OSA configured either as TOSAs or ROSAs.

The optoelectronic device 100 can be configured for optical signal transmission and/or reception at a variety of per-second data rates including, but not limited to, 1.25 Gbit, 2.125 Gbit, 2.5 Gbit, 2.67 Gbit, 4.25 Gbit, 8.5 Gbit, 10 Gbit, 10.3 Gbit, 10.5 Gbit, or higher. Further, the optoelectronic device 100 can be configured for optical signal transmission and reception at various wavelengths including, but not limited to, 850 nm, 1310 nm, 1470 nm, 1490 nm, 1510 nm, 1530 nm, 1550 nm, 1570 nm, 1590 nm, 1610 nm, or longer wavelengths. Also, the optoelectronic device 100 can be configured to support various communication protocols including, but not limited to, Fast Ethernet, Gigabit Ethernet, 10 Gigabit Ethernet, 1x, 2x, 4x, 8x, and 10x Fibre Channel, and SONET OC-3, OC-12, OC-48, OC-192, and OC-768. Further, the optoelectronic device 100 can be configured to operate at various temperature ranges including, but not limited to, 0° C. to 70° C. and −40° C. to 85° C.

Figure 4:
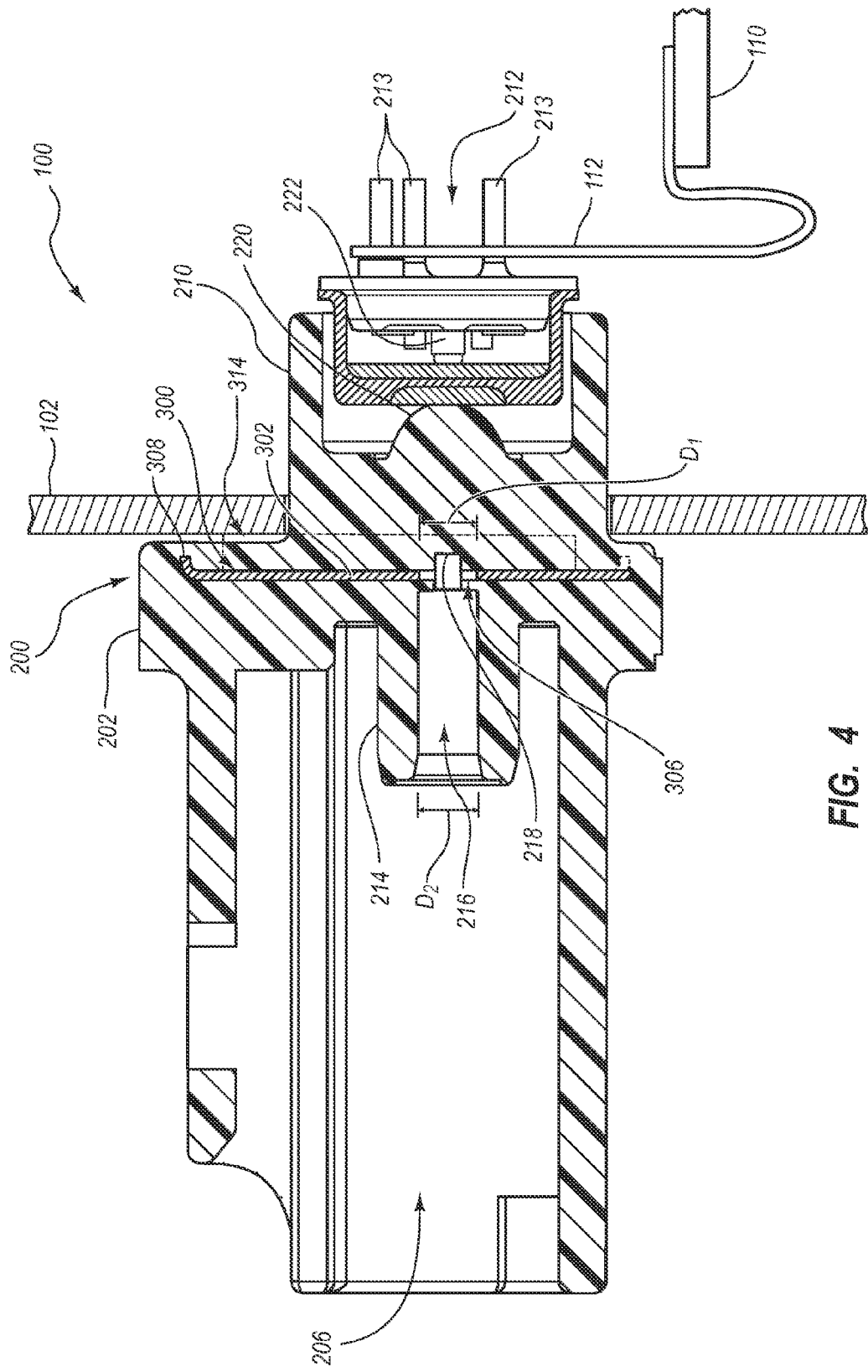
FIG. 4 is a cross-sectional side view of portions of the example optoelectronic device and the example OSA of FIG. 1A.

With continued reference to FIGS. 1A and 1B, the transducer assembly 212 of the OSA 200 further houses an optical-electronic or electronic-optical transducer (see transducer 222 of FIG. 4). The transducer 222 may be an optical receiver, such as a photodiode, or an optical transmitter, such as a laser. The transducer 222 is electrically coupled to the PCB 110 via the pins 213 of the transducer assembly 212 and optionally one or more other electrical interfaces, such as the flexible circuit 112. When the transducer 222 is an optical receiver, the transducer 222 is configured to convert optical signals received through the connector port 206 into corresponding electrical signals that are relayed to the PCB 110. When the transducer 222 is an optical transmitter, the transducer 222 is configured to convert electrical signals received through the PCB 110 from a host device (not shown) into corresponding optical signals that are transmitted through the connector port 206 of the receptacle 204. The receptacle 204 is configured to optically connect the transducer 222 with an LC optical fiber connector that is engaged within the connector port 206 of the receptacle 204.

Having described a specific environment with respect to FIG. 1, it will be understood that this specific environment is only one of countless architectures in which example embodiments of the present invention may be employed. The scope of the present invention is not intended to be limited to any particular environment.

2. Example OSA Having an Example EMR Shield

Figure 2:
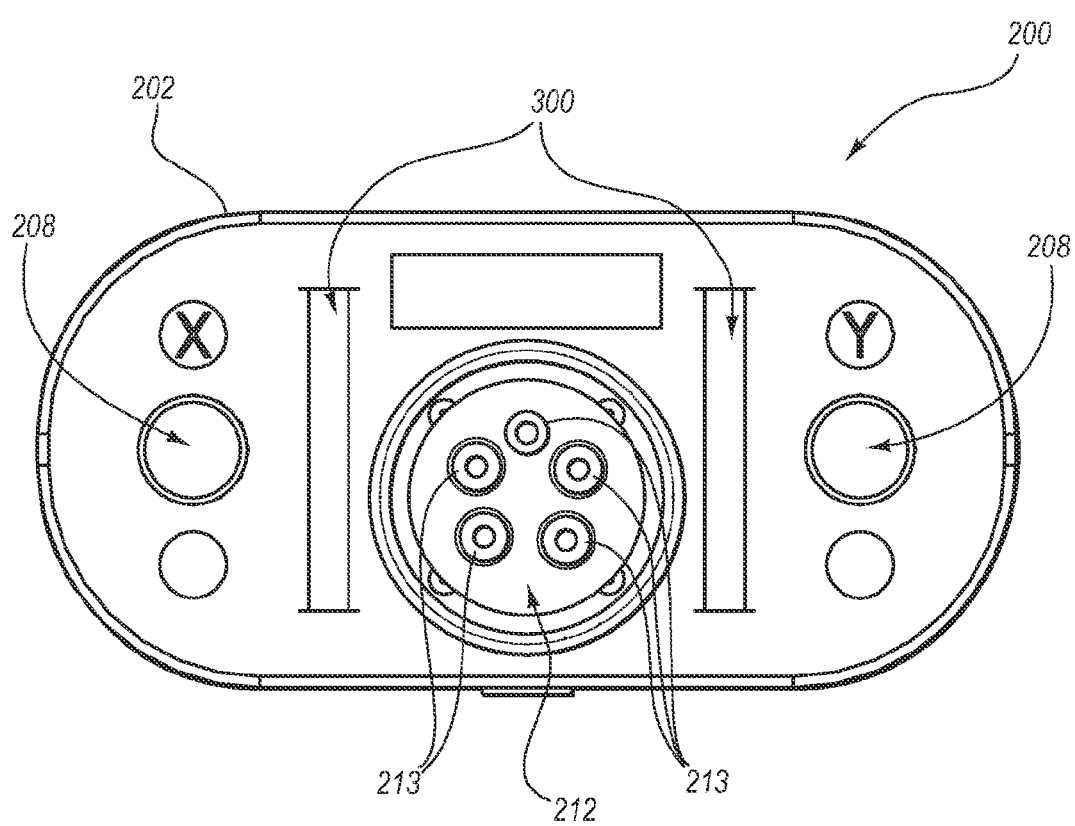
FIG. 2 is a rear view of the example OSA of FIG. 1A with an example electromagnetic radiation (EMR) shield partially embedded in the body of the OSA.
Figure 3:
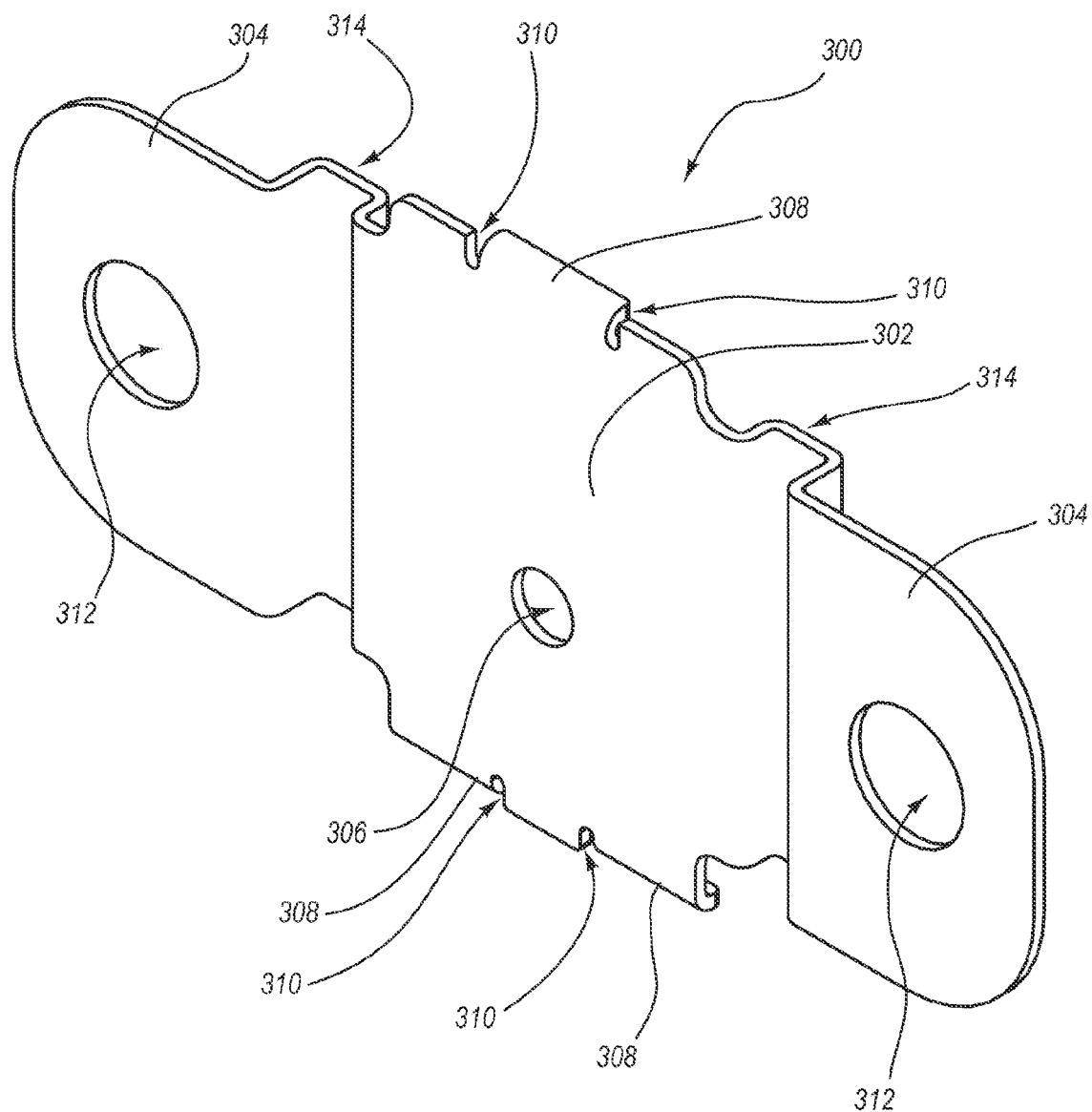
FIG. 3 is a front perspective view of the example EMR shield of FIG. 2.

With reference now to FIGS. 2-4, additional aspects of the example OSA 200 are disclosed. With particular reference first to FIG. 2, the example OSA 200 further includes an example EMR shield 300 that is partially embedded in the body of the OSA 200 (also see FIG. 4). In particular, portions of the example EMR shield 300 extend out of the flange 202 of the OSA 200 in order to make contact with a grounded structure of an optoelectronic device (such as the faceplate 102 of the optoelectronic device 100 of FIGS. 1A and 1B) when the OSA 200 is attached to the optoelectronic device. This electrical contact between the EMR shield 300 and the grounded structure can ground the EMR shield 300. Grounding the EMR shield 300 can further enhance the effectiveness of the EMR shield 300.

With reference now to FIG. 3, additional aspects of the example EMR shield 300 are disclosed. The example EMR shield 300 includes a central portion 302, one or more wings 304 extending outward from the central portion 302, and a substantially centrally located (relative to the central portion 302) opening 306 defined in the central portion 302. The example EMR shield 300 may also include a plurality of bent portions 308 that may act as a physical and electrical barrier to EMR waves along the perimeter of the EMR shield 300. The example EMR shield 300 may also include a plurality of notches 310 and/or other cutouts or structural features defined along the perimeter of the central portion 302, or elsewhere, that can assist in the molding process of the body of the OSA 200. An aperture 312 is defined in each wing 304, as disclosed in greater detail below, and each wing 304 may also include a protruding structure such as a protrusion 314 between the aperture 312 and the central portion 302. In general, a given embodiment of the EMR shield 300 may include variable configurations including, but not limited to, the number, spacing, geometry, size, and locations of the wings 304, bent portions 308, notches 310, apertures 312, and protrusions 314.

In one example embodiment, the EMR shield 300 can be stamped or otherwise produced from a material that is effective at controlling passage of EMR, such as stainless steel sheet metal, one example of which is electrolytically tin plated (SPTE) sheet metal, or other sheet metal. In some example embodiments, the EMR shield 300 may be formed from sheet metal having a thickness of about 0.25 mm and/or formed from sheet metal that is ¾ hard or is full hard. In other example embodiments, it is understood that the EMR shield 300 can be formed, using stamping or other processes, from other materials that are effective at controlling passage of EMR.

Although the example EMR shield 300 is substantially rectangular with rounded corners, it is understood that the EMR shield 300 may instead have any another suitable shape including, for example, circular, triangular, or polygonal. In some example embodiments, the shape of the EMR shield 300 may be substantially the same as a cross-sectional shape of the flange of an OSA into which the EMR shield 300 is embedded. For example, the shape of the perimeter of the EMR shield 300 may be approximately the same as the shape of the flange 202 into which the EMR shield 300 is embedded.

During the manufacture of the example OSA 200, the EMR shield 300 is placed in a mold (not shown). A structure of the mold, such as a molding tool (not shown), may be configured to mate with the apertures 312 is order to properly position the EMR shield 300 within the mold. The location and size tolerances of the apertures 312 may accordingly need to be tightly controlled in order to properly align the EMR shield 300 within the mold structure. As an alternative to the use of the apertures 312, the EMR shield 300 may be positioned using some portion of the perimeter of the EMR shield 300, in which case the location and size tolerances of the perimeter may need to be tightly controlled. More generally, the EMR shield 300 can include any structural elements(s) suitable to enable positioning and retention of the EMR shield 300 in the mold.

After the EMR shield 300 is properly positioned within the mold, a liquid or semi-liquid optically transmissive thermoplastic material may be injected into the mold. Although the perimeter of the EMR shield 300 is approximately the same size and shape as that of the flange 202 of the OSA 200 (see FIG. 2), the notches 310 in the perimeter of the central portion 302 may be sized and configured such that the notches 310 at least partially define one or more fluid passageways so that during the molding of the body of the OSA 200, the thermoplastic material from which the body of the OSA 200 is molded can readily flow through the notches 310 to all portions of the mold. In this way, the notches 310 enable the EMR shield 300 to be partially embedded into body of the OSA 200 during the molding of the body of the OSA 200. A portion of the thermoplastic material also remains positioned within the notches 310 after the molding of the body of the example OSA 200. The size, shape, orientation, location, and number of notches 310 or other structural features which would provide comparable functionality defined in the EMR shield 300 can be adjusted according to a variety of factors including, but not limited to, the data rate at which the OSA 200 communicates and the viscosity of the thermoplastic from which the body of the OSA 200 is molded.

As disclosed in FIG. 2, a portion of each protrusion 314 extends outside the flange 202 in order to contact one or more grounded structures of an optoelectronic device (such as the grounded faceplate 102 of the optoelectronic device 100 of FIGS. 1A and 1B), to which the OSA 200 may be attached. This extension of a portion of each protrusion 314 outside the flange 202 can result in relatively secure electrical connections between the EMR shield 300 and the grounded structure of the optoelectronic device. It is noted that in some example embodiments, only one protrusion 314, or more than two protrusions 314, may extend outside the flange 202 in order to contact a grounded structure of an optoelectronic device. Further, the protrusion 314 could have other shapes, configurations, orientations, and/or locations, and the term "protrusion" is therefore not limited to the shape, configuration, orientation, and location of the protrusions 314.

With reference to FIG. 4, additional aspects of the OSA 200 and the EMR shield 300 are disclosed. As disclosed in FIG. 4, the body of the OSA 200 further includes a barrel 214 that, together with the flange 202, defines a fiber port 216. The body of the OSA 200 also includes a first lens 218 integrally defined within the flange 202 and a second lens 220 integrally defined within the barrel 210. The integration of the lens 220 within the barrel 210 eliminates the need of a separate lens, thus eliminating the cost of producing separate parts and subsequent assembly.

The fiber port 216 is sized and configured to receive an optical fiber and/or an optical fiber ferrule. For those example embodiments where the body of the OSA 200 is molded from an optically transmissive thermoplastic material, optical signals can pass between the lenses 218 and 220 through the opening 306 of the EMR shield 300. In particular, the lenses 218 and 220 are sized, configured, and aligned to focus and/or otherwise process optical signals passing through the opening 306 between a core of an optical fiber positioned in the fiber port 216 and a transducer 222 positioned in the transducer assembly 212. It is noted that other example embodiments may omit one or both of the lenses 218 and 220, or may include additional lenses.

The opening 306 that is positioned between the lenses 218 and 220 has a diameter $D_1$ and the fiber port 216 has a diameter $D_2$. In some example embodiments, the diameter $D_1$ of opening 306 is larger than the diameter $D_2$ of the fiber port 216, although in other example embodiments the diameter $D_1$ is the same as or smaller than the diameter $D_2$. In the example embodiment disclosed in FIG. 4, the diameter $D_1$ of the opening 306 of the EMR shield 300 is smaller than the diameter $D_2$ of the fiber port 216 of the OSA 200. Although the diameter $D_2$ of the fiber port 216 of the OSA 200 must be large enough to receive an optical fiber and/or an optical fiber ferrule, the core of the optical fiber is generally smaller in diameter than the diameter $D_2$ due to the presence of various cladding layers surrounding the core of the optical fiber and/or due to the optical fiber ferrule surrounding the core. Therefore, even where the diameter $D_1$ is smaller than the diameter $D_2$, the EMR shield 300 can help control the transmission of EMR without materially impeding the transmission of optical signals between the core of an optical fiber received in the fiber port 216 and the transducer housed in the transducer assembly 212.

In particular, the relatively smaller size of the diameter $D_1$ of the opening 306 can increase the effectiveness of the EMR shield 300 by effecting a relative reduction in the amount of EMR that can escape through the fiber port 216 of the OSA 200. The relatively smaller size of the diameter $D_1$ of the opening 306 can also increase the effectiveness of the EMR shield 300 by effecting a relative reduction in the amount of EMR that can enter the OSA 200 through the fiber port 216, while also being large enough to allow optical signals to pass between the lenses 218 and 220.

It is understood that an EMR shield 300 can be shaped however necessary to accommodate a particular OSA geometry and/or a particular geometry of a ground structure of an optoelectronic device to which the OSA is attached. Therefore, the configuration of the EMR shield 300 is to be considered as an example only and is not limiting of the scope of the invention.

As disclosed in FIG. 4, once the example EMR shield 300 is partially embedded into the body of the example OSA 200, portions of the protrusions 314 (only one of which is shown in FIG. 4) of the EMR shield 300 can extend out of body (a more complete view of the protrusions 314 is disclosed in FIG. 3). These portion of the protrusions 314 that extend out of the body of the OSA 200 can electrically communicate with a grounded structure, such as the faceplate 102, of the optoelectronic device 100 into which the OSA 200 is integrated. In one embodiment, for example, one or more of the protrusions 314 electrically communicate with ground through physical contact with the grounded faceplate 102 or other grounded structure of the optoelectronic device 100 into which the OSA 200 is integrated, as disclosed in FIG. 4. Grounding the EMR shield 300 can further enhance the effectiveness of the EMR shield 300.

The example EMR shield disclosed herein can therefore aid in the control of the amount of EMR that passes through OSAs into which the EMR shield is integrated. OSAs that include these EMR shields can, in turn, be effective at limiting the transmission of EMR out of and/or into optoelectronic devices into which the OSAs are integrated. These example OSAs can be effective at limiting the transmission of EMR while avoiding the difficulties and costs associated with coating OSAs with metal or forming OSAs from metal.

It is understood that in some example embodiments, the generally simplex construction of the OSA 200 may be replaced with an OSA having duplex construction where two fiber ports are arranged within one or two receptacle ports and attached to a single flange. These OSAs having duplex construction may include an EMR shield having two openings each corresponding to and aligned with one of the fiber ports.

The example embodiments disclosed herein may be embodied in other specific forms. The example embodiments disclosed herein are to be considered in all respects only as illustrative and not restrictive.

What is claimed is:

1. An electromagnetic radiation (EMR) shield comprising:
   a central portion;
   an opening defined in the central portion;
   a wing attached to and extending outward from the central portion; and
   a protrusion defined in the wing;
   wherein a perimeter of the EMR shield is approximately the same size and shape as that of a portion of an associated optical subassembly (OSA), wherein the opening has a diameter that is smaller than a diameter of a fiber port.

2. The EMR shield as recited in claim 1, wherein the EMR shield comprises stamped sheet metal.

3. The EMR shield as recited in claim 1, wherein a portion of a fluid passageway is defined along the perimeter of the central portion of the EMR shield.

4. The EMR shield as recited in claim 1, wherein each wing is configured to mate with a corresponding structure of an insert mold.

5. The EMR shield as recited in claim 1, wherein the opening defined in the central portion is substantially centrally located with respect to the central portion.

6. The EMR shield as recited in claim 1, further comprising one or more additional wings extending outward from the central portion at substantially regular intervals.

7. The EMR shield as recited in claim 1, further comprising a plurality of bent portions located along the perimeter of the central portion of the EMR shield.

8. An OSA comprising:
   a body comprising:
      a receptacle that defines a connector port;
      a flange extending from the receptacle;
      a first barrel extending from the flange and defining a lens;

a second barrel defined within the connector port that defines a fiber port configured to receive an optical fiber, the fiber port having a diameter; and an EMR shield at least partially embedded in the body, the EMR shield comprising:
 a central portion;
 a wing attached to and extending outward from the central portion;
 a protrusion connected to the wing and/or the central portion that extends outside the body; and
 an opening defined in the central portion, wherein the opening has a diameter that is smaller than the diameter of the fiber port.

9. The OSA as recited in claim 8, wherein the receptacle, flange, first barrel, lens, and second barrel comprise an optically transmissive thermoplastic material.

10. The OSA as recited in claim 8, wherein the receptacle, flange, first barrel, lens, and second barrel are integral with each other and comprise an optically transmissive thermoplastic material.

11. The OSA as recited in claim 10, wherein the EMR shield further comprises a plurality of notches located along the perimeter of the central portion of the EMR shield, and embedded in the thermoplastic material.

12. The OSA as recited in claim 8, further comprising a plurality of bent portions located along the perimeter of the central portion of the EMR shield.

13. The OSA as recited in claim 8, further comprising a transducer housed in the first barrel.

14. The OSA as recited in claim 8, wherein the EMR shield comprises stamped stainless steel sheet metal.

15. An optoelectronic device comprising:
 a faceplate;
 a printed circuit board (PCB); and
 an OSA attached to the faceplate and electrically connected to the PCB, the OSA comprising:
  a body comprising:
   a receptacle that defines a connector port;
   a flange extending from the receptacle;
   a first barrel extending from the flange and defining a lens;
   a second barrel defined within the connector port that defines a fiber port configured to received an optical fiber, the fiber port having a diameter; and
  an EMR shield at least partially embedded in the body, the EMR shield comprising:
   a central portion;
   a wing attached to and extending outward from the central portion;
   a protrusion connected to the wing and/or the central portion that extends outside the body and is in electrical contact with the faceplate; and
   an opening defined in the central portion, wherein the opening has a diameter that is smaller than the diameter of the fiber port.

16. The optoelectronic device as recited in claim 15, wherein the OSA has a bulkhead form factor.

17. The optoelectronic device as recited in claim 15, wherein the receptacle, flange, first barrel, lens, and second barrel are integral with each other and comprise an optically transmissive thermoplastic material.

18. The optoelectronic device as recited in claim 17, wherein the EMR shield further comprises a plurality of notches located along the perimeter of the central portion of the EMR shield, and embedded in the thermoplastic material.

* * * * *